(12) United States Patent
Cafaro

(10) Patent No.: US 7,475,915 B2
(45) Date of Patent: Jan. 13, 2009

(54) DEVICE BY PIPELINE DIVERSION

(75) Inventor: Carlo Samuele Cafaro, Stavanger (NO)

(73) Assignee: Vetco Gray Scandinavia AS, Billingstad (NO)

( * ) Notice: Subject to any disclaimer, the term of this patent is extended or adjusted under 35 U.S.C. 154(b) by 368 days.

(21) Appl. No.: 10/484,093

(22) PCT Filed: Jul. 18, 2002

(86) PCT No.: PCT/NO02/00267

§ 371 (c)(1),
(2), (4) Date: Jun. 17, 2004

(87) PCT Pub. No.: WO03/008853

PCT Pub. Date: Jan. 30, 2003

(65) Prior Publication Data

US 2004/0231081 A1 Nov. 25, 2004

(30) Foreign Application Priority Data

Jul. 20, 2001 (NO) .................................. 20013611

(51) Int. Cl.
*F16L 51/00* (2006.01)
(52) U.S. Cl. ................. 285/131.1; 285/126.1; 285/181; 285/920; 166/348; 405/169; 405/184.5

(58) Field of Classification Search ................. 166/343, 166/348; 405/169–170, 184.5; 285/131.1, 285/181, 284.1, 126.1, 920
See application file for complete search history.

(56) References Cited

U.S. PATENT DOCUMENTS

| 973,794 | A | * | 10/1910 | Lightcap ................. 15/104.061 |
| 2,656,853 | A | * | 10/1953 | Scheele ....................... 137/551 |
| 3,116,503 | A | * | 1/1964 | Bagwell ................. 15/104.062 |
| 4,971,307 | A | | 11/1990 | Killerud et al. |
| 5,437,302 | A | | 8/1995 | Da Silva et al. |
| 5,857,715 | A | | 1/1999 | Gray et al. |
| 5,921,713 | A | * | 7/1999 | Gjessing et al. ............. 405/170 |
| 6,142,708 | A | | 11/2000 | Tarlton et al. |

* cited by examiner

*Primary Examiner*—Aaron M Dunwoody
*Assistant Examiner*—Fannie Kee
(74) *Attorney, Agent, or Firm*—Venable LLP; Eric J. Franklin (57) ABSTRACT

A device for at least one of a pig launching/receiving device or a connecting pipe to a submerged pipeline. A deflection bend is operatively connected to the pipeline. A blind pipe projects from the deflection bend. The blind pipe is substantially concentric with and extends in an opposite direction to the pipeline. The blind pipe is not in fluid communication with the deflection bend.

5 Claims, 8 Drawing Sheets

DEVICE BY PIPELINE DIVERSION

CROSS-REFERENCE TO RELATED APPLICATIONS

This application claims priority to Norwegian patent application 20013611 filed 20 Jul. 2001 and is the national phase under 35 U.S.C. § 371 of PCT/N002/00267.

FIELD OF THE INVENTION

This invention regards a device for simplifying remote connection/disconnection of equipment to a pipeline on the seabed. In particular, the invention regards a pipe deflection where connection and disconnection to a subsea pipeline of another pipe and/or a device for launching and receiving a pig may be carried out by means of said remote connection and possibly remotely operated vehicle (ROV), especially for use in connection with subsea pipelines of the type commonly used in connection with the production and transportation of petroleum. The preferred designation for the invention is "trunnion bend pieces".

BACKGROUND OF THE INVENTION

When laying pipelines on the seabed, it is common according to prior art for the lay vessel to lower the free end portion of the pipe down to the seabed.

During pipe maintenance, pigs are sent through the pipe e.g. to clean, check and/or test the pipe. According to prior art, a separate manifold/structure is installed on the seabed by means of a lifting vessel brought to the site, whereupon the pipeline is pulled into and connected to the manifold.

Alternatively, the end portion of the pipeline may be lifted to the surface, where a manifold is welded on. Then the pipeline can be re-installed.

According to prior art, a shroud is normally constructed underneath valves and couplings that are to be installed directly in line with the pipeline. The shroud ensures an even transition between the pipe and the bottom profiles of the valves/couplings, which is required in order to enable the valves/couplings to be passed across rollers on the lay ramp of the lay vessel. Furthermore, the shroud is commonly used to ensure that the end portion of the pipe does not sink into the seabed, whereby the end opening of the pipe would be inaccessible. The underlying shroud will distribute the weight of the pipe and the manifold over a somewhat larger area.

Separate structures of this type require extensive construction and fabrication work. A lack of standardisation makes it necessary to do the construction work again for each pipe, and to tailor e.g. the maintenance work to each particular case. The underlying shroud at the end portion of the pipe must extend along a relatively long section of the end portion of the pipe in order to be able to pass across the lay ramp of the lay vessel. Valves welded directly to the pipeline are subjected to relatively large bending moments, thus being prone to damage or becoming less reliable in operation.

It appears that the risk of hydrocarbon leaks/spills increases with the number of connections. Thus the relatively large number of connections associated with prior art manifolds is a disadvantage. Installing a pipe with a separate manifold involves the lay vessel having to spend extra time in order to arrange and connect the manifold to the pipe, or optionally the use of a lifting vessel to carry out the connecting operation. Consequently, the connecting operation is unnecessarily expensive.

SUMMARY OF THE INVENTION

The object of the invention is to remedy the disadvantages of prior art.

The object is achieved in accordance with the invention by the characteristics given in the description below.

Arranging a connection device for a pig launching/receiving device at a level slightly above the seabed avoids the connection device sinking into the seabed. According to the invention, the pipeline is equipped with a first bend at a distance from the end portion of the pipeline, whereby the hydrocarbon carrying pipe is deflected. A blind pipe, preferably without fluid connection with the hydrocarbon carrying pipe, is substantially concentric with and extends in the opposite direction of the pipeline from the first bend and on to the end portion of the pipeline, where it is connected to a pad eye.

The hydrocarbon carrying pipe is deflected preferably to a horizontal position by means of a second bend, and is equipped with a shut-off valve and a connection device for a pig launching/receiving device.

By giving the deflection the appropriate design, it becomes possible to lead the deflection with valves and couplings down to the seabed as part of the pipeline, via the lay ramp of the lay vessel.

The deflected pipe is well suited e.g. for branching off a pipe for remote connection to a subsea installation.

Advantageously, said valves and connection devices may be controlled remotely according to techniques that are known per se.

BRIEF DESCRIPTION OF THE DRAWINGS

The following describes a non-limiting example of a preferred embodiment illustrated in the accompanying drawings, in which.

DETAILED DESCRIPTION OF EMBODIMENTS OF THE INVENTION

In the drawings, reference number 1 denotes a deflection pipe arranged on the seabed 2, comprising a pipeline 3, a first bend 4 connected to the pipeline 3 and also to a transition piece 6, here shown as a T-piece, and a blind pipe 8 extending from the first bend 4 and essentially coaxially with the pipeline 3, from the bend 4 to a pad eye 10. The blind pipe 8 and the pad eye 10 constitute the end portion of the pipeline.

The transition piece 6 is further connected to a second bend 12 that is connected to a remote connection 16 via a valve 14 and to a remote connection 22 via a third bend 18 and a valve 20. The valves 14, 20 and the remote connections 16, 22 are of types that are known per se and designed to be operated remotely by e.g. an ROV.

The pipeline 3 and the blind pipe 8 are equipped with the necessary fixing brackets 24 for fixing the remote connections 16, 22, a first vertical column 26 and a second vertical column 28. The columns 26, 28 are connected to guide cables 30 and 32 respectively, extending to the surface. The column 26 and the guide cable 30 are designed to guide a pig launching/receiving device 34 during lowering from the surface down to the deflection 1, where it fits the remote connection 16 in a complementary manner.

The column 28 and the guide cable 32 are designed to guide a connecting pipe 36 during lowering from the surface down to the deflection 1, where it fits the remote connection 22 in a complementary manner.

Figure 3:
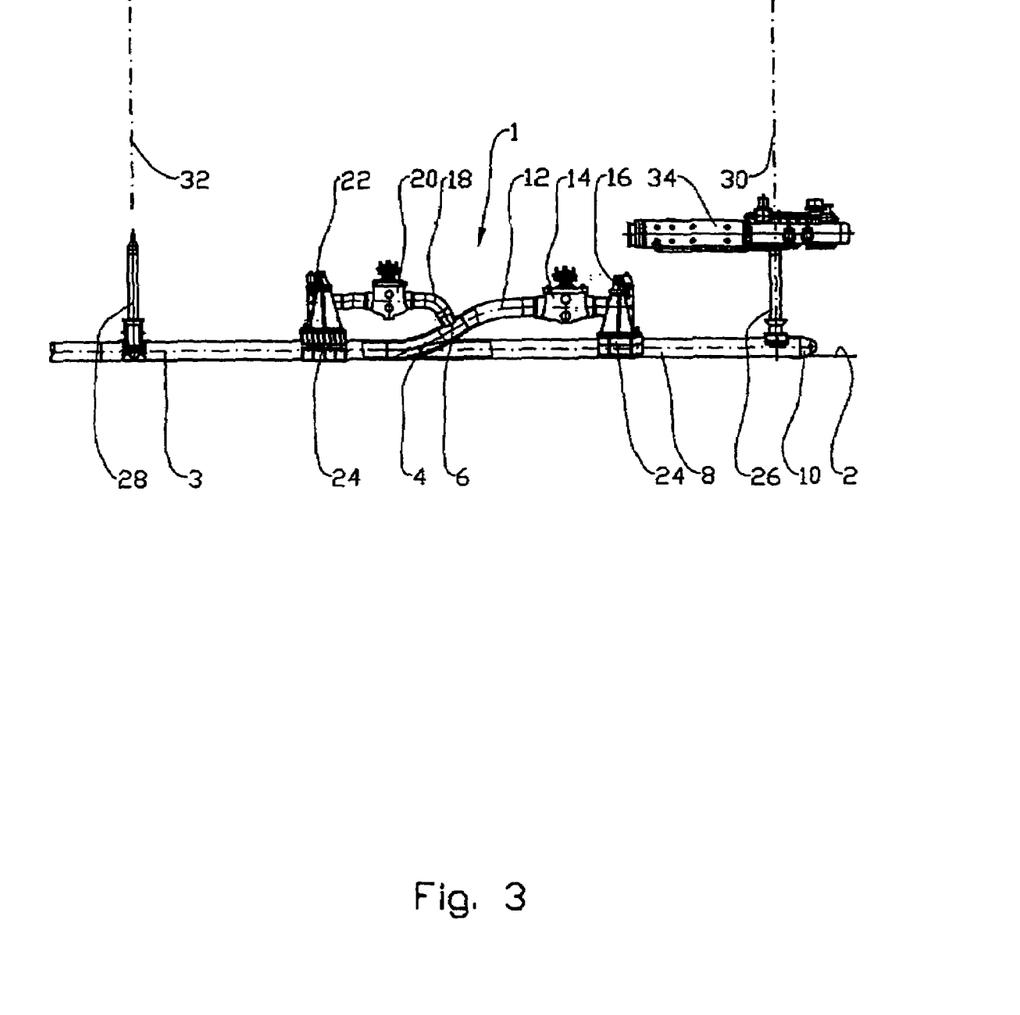
FIG. 3 is a partially sectioned side view of the deflection of FIG. 1 as a pig launching/receiving device is on its way down from the surface.
Figure 4:
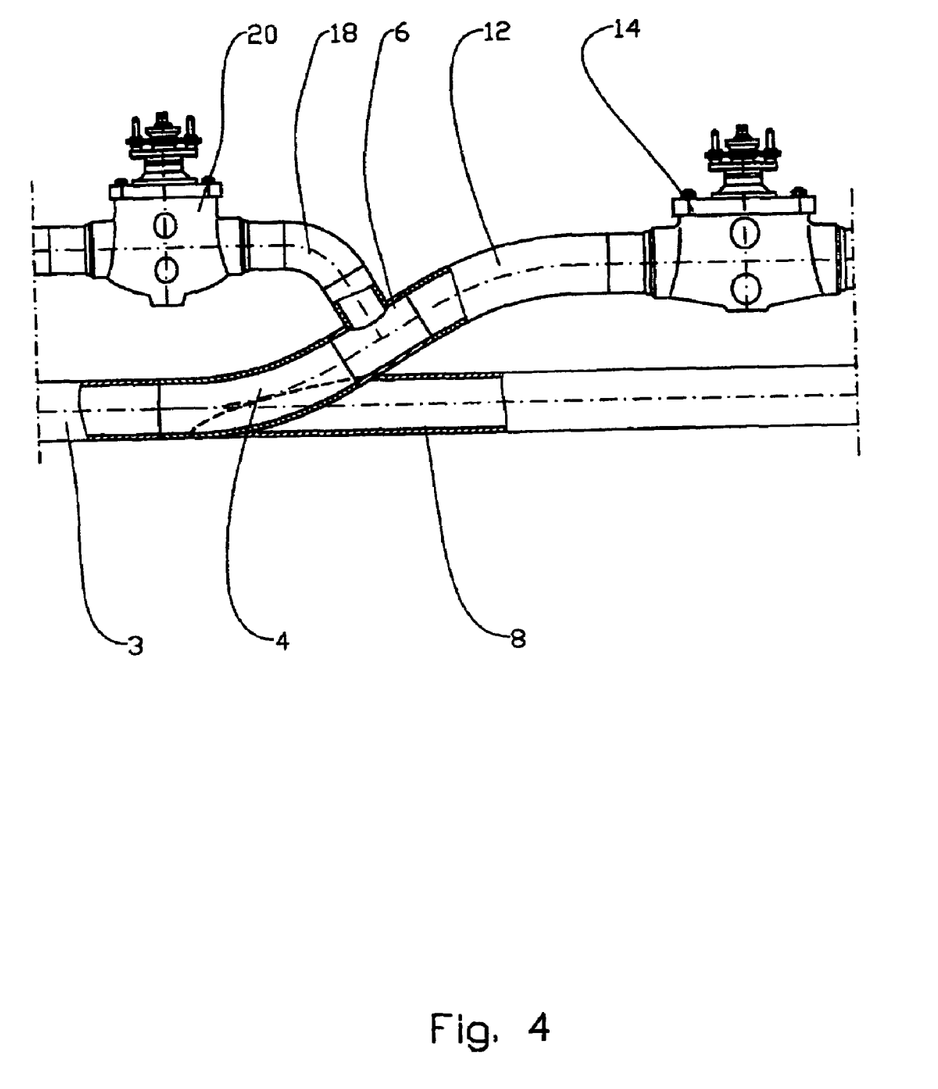
FIG. 4 shows a cutout of FIG. 2 on a larger scale. The pipeline deflection is shown emphasized and comprises a first bend, a blind pipe, a transition piece and a second bend.
Figure 5:
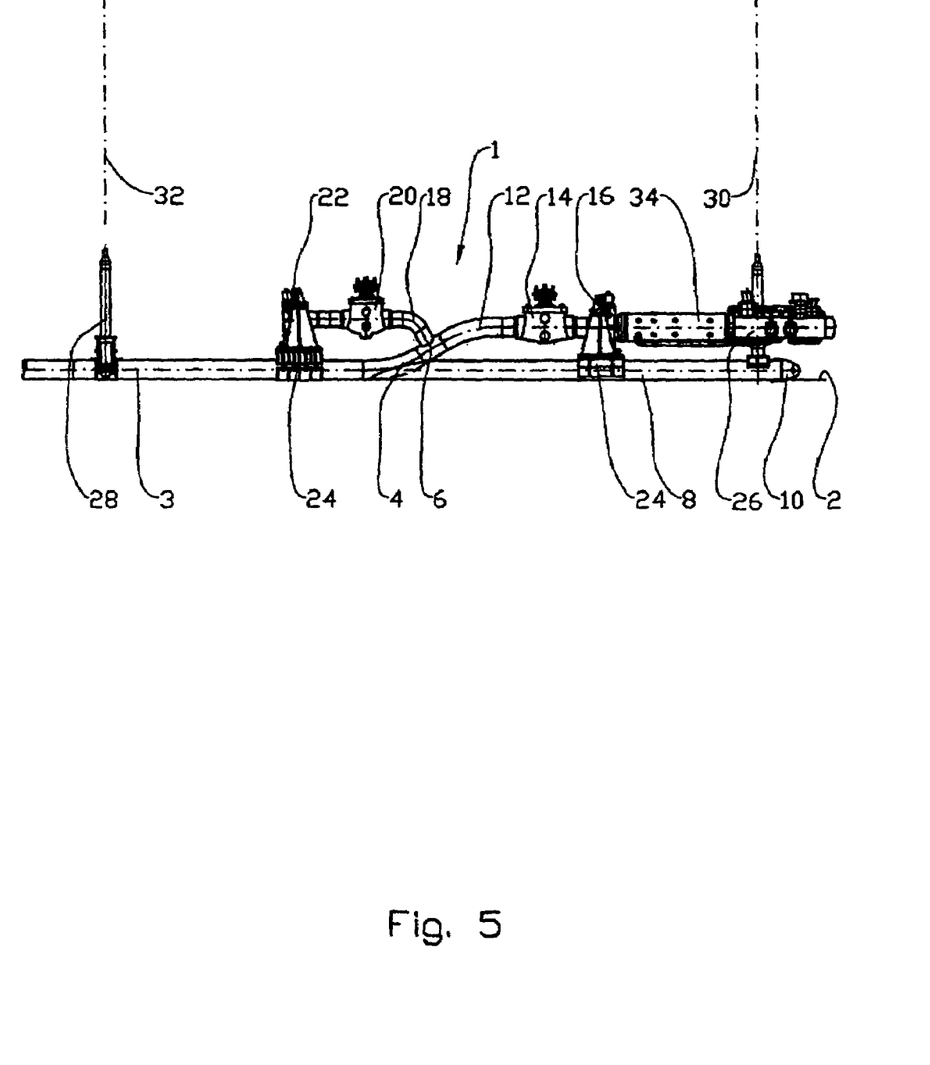
FIG. 5 shows the same as FIG. 3, but here, the pig launching/receiving device is connected to the deflection.
Figure 6:
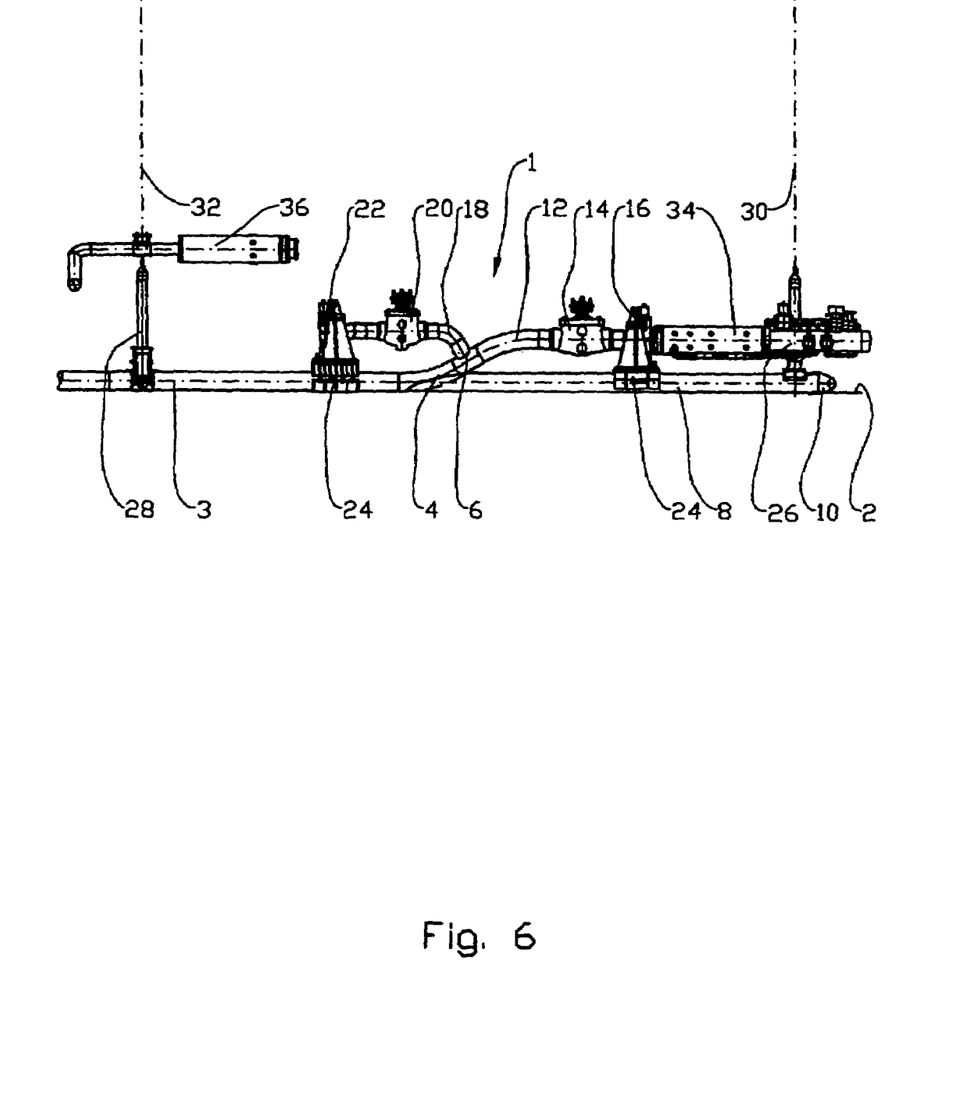
FIG. 6 shows the same as FIG. 5, but here, a connecting pipe is on its way down from the surface.
Figure 7:
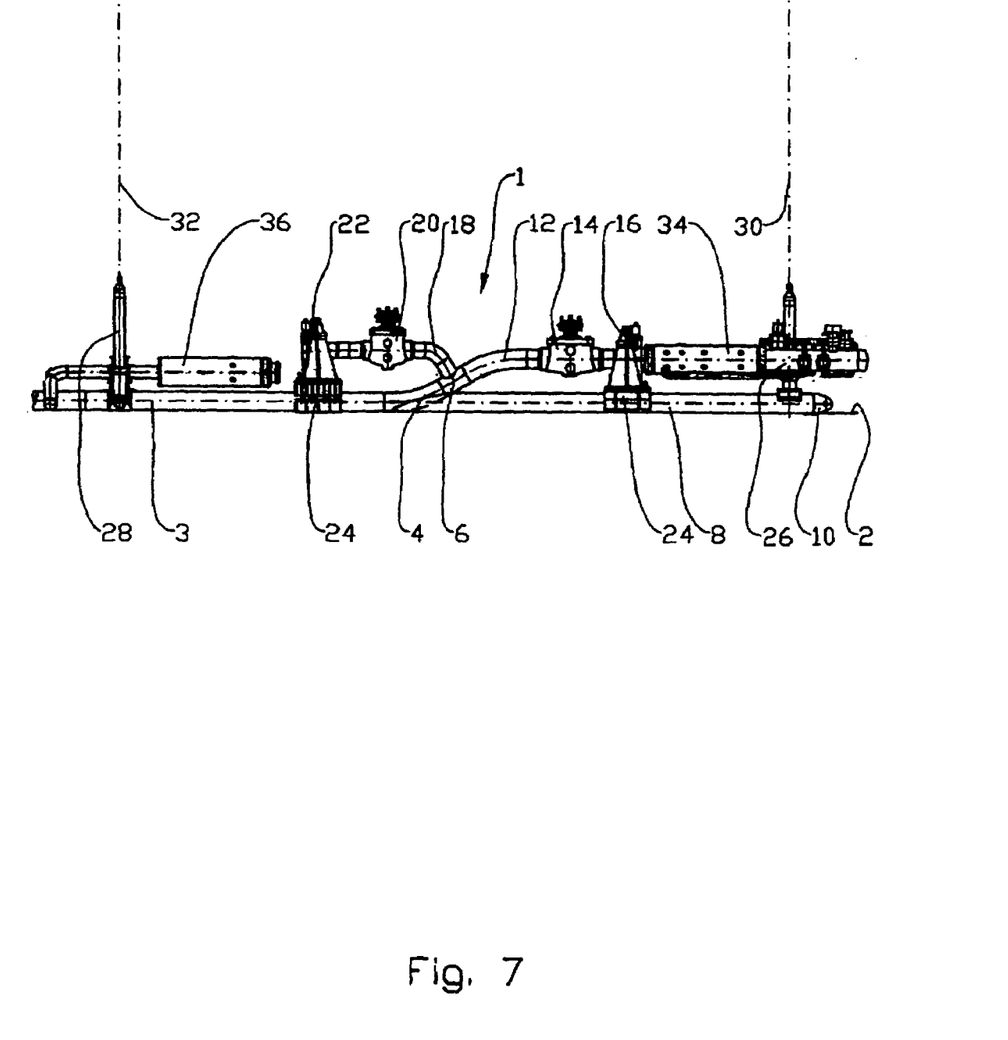
FIG. 7 shows the same as FIG. 6, but here, the connecting pipe has been lowered and is ready for connection to the deflection.
Figure 8:
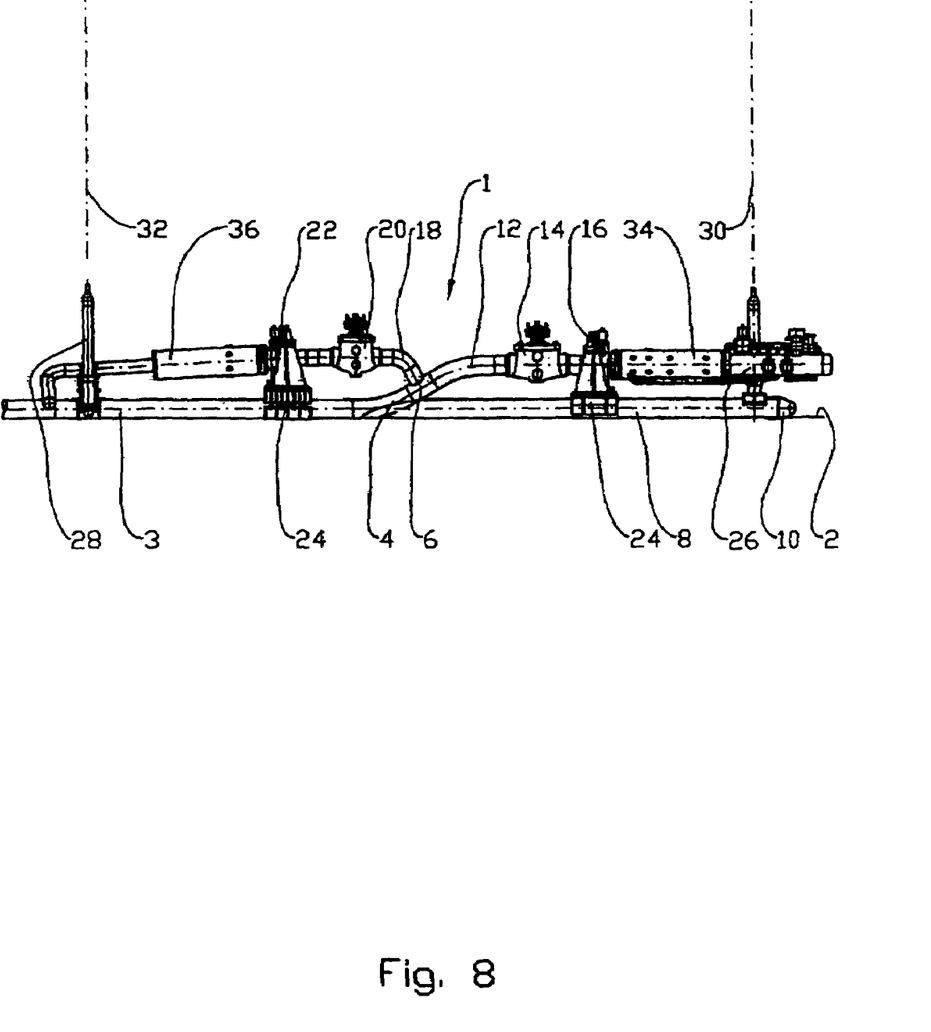
FIG. 8 shows the same as FIG. 7, but here, the connecting pipe has been connected to the deflection.

FIGS. 3 and 5 show a pig launching/receiving device 34 that is lowered in accordance with known techniques via the guide cable 30 and the column 26 and then connected to a remote connection 16, while FIGS. 6, 7 and 8 show a connecting pipe 36 that is lowered in accordance with known techniques via the guide cable 32 and the column 28, whereupon it is connected to the remote connection 22.

Figure 1:
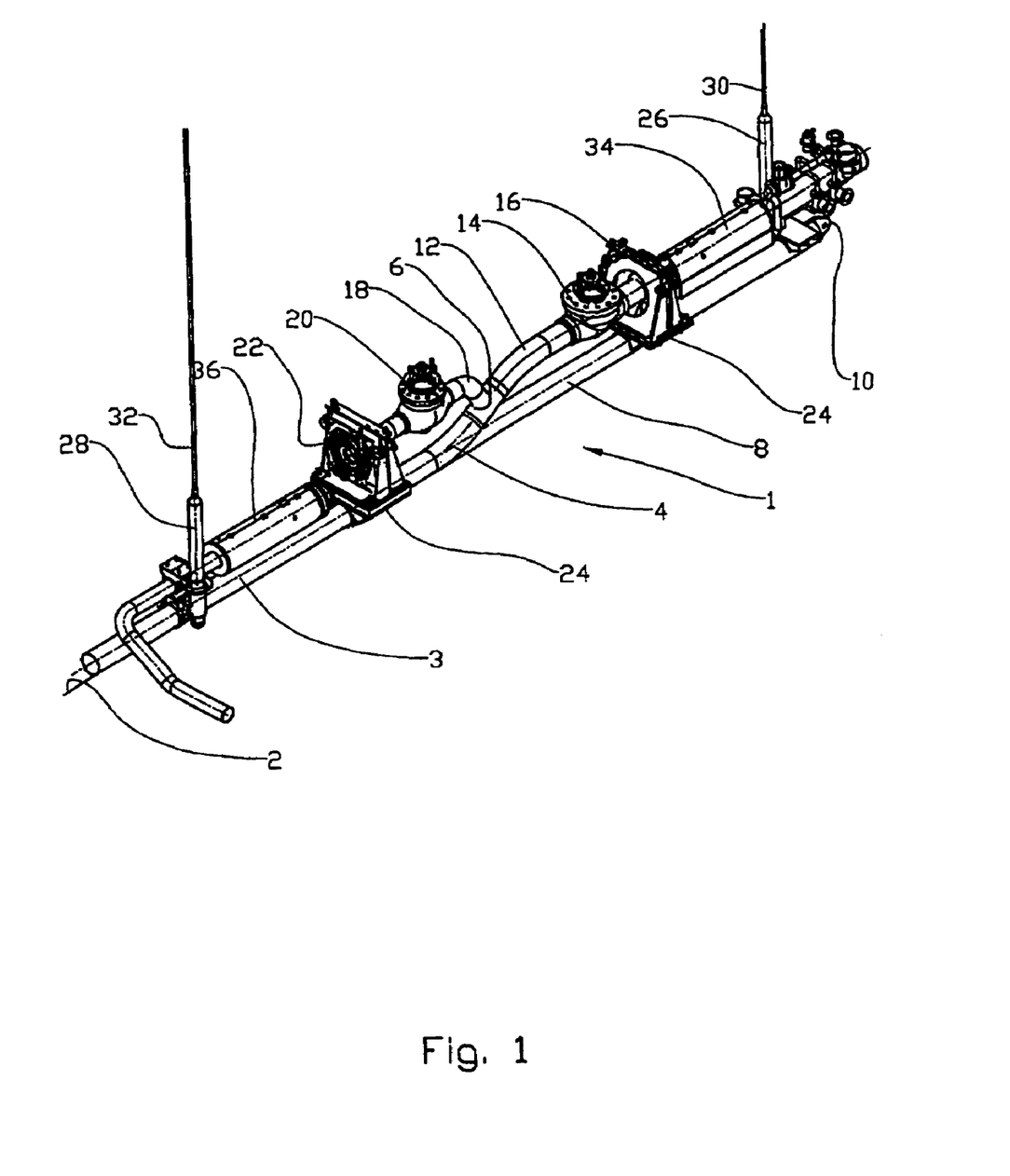
FIG. 1 is a perspective view of a deflection according to the invention, where a pig launching/receiving device is connected to the deflection, and where a connecting pipe is being connected.
Figure 2:
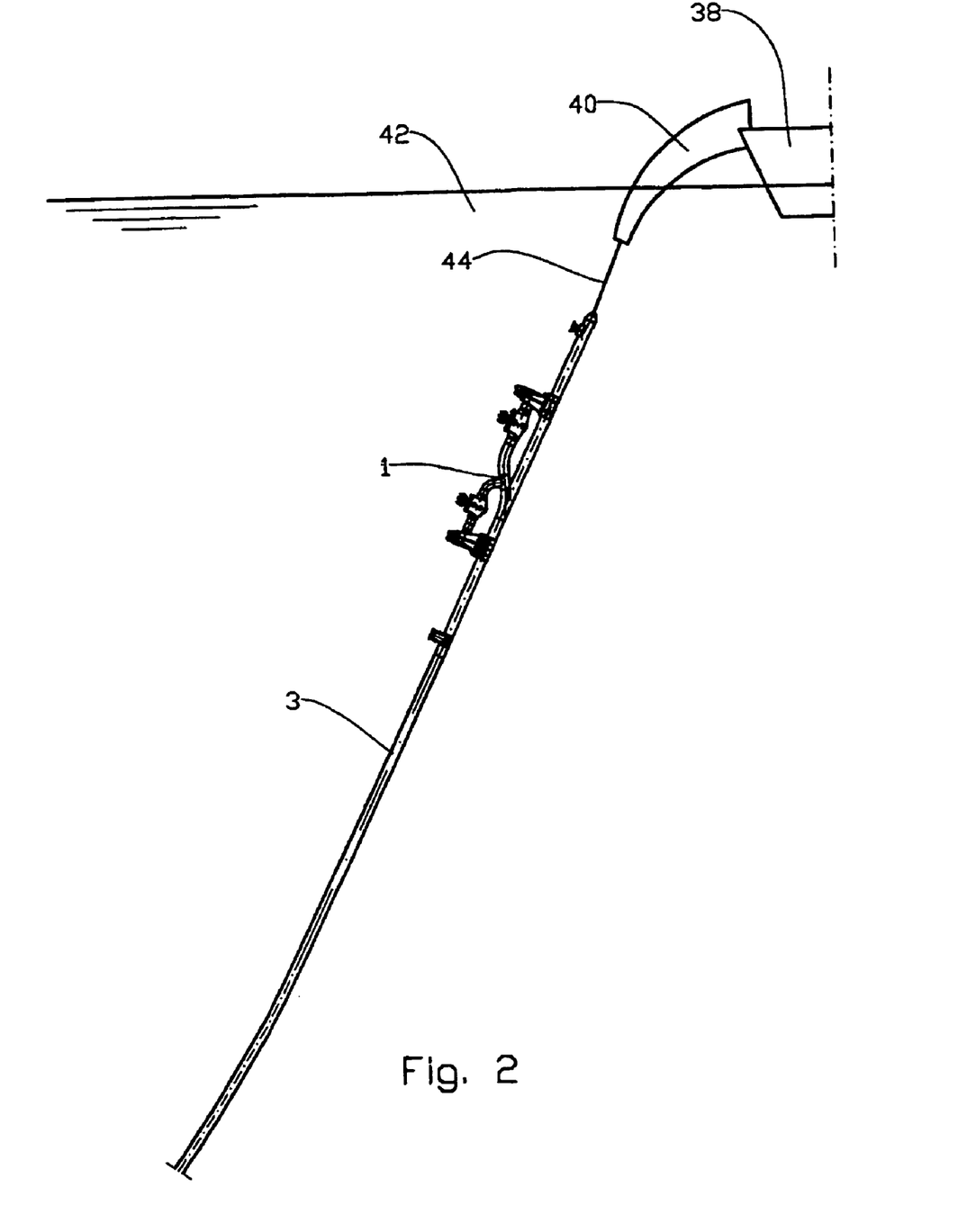
FIG. 2 is a schematic diagram of a deflection on its way down to the seabed from a pipelaying vessel.

When a deflection 1 is to be laid on the seabed 2 to form an end portion of the pipeline 3, it is connected to the pipeline 3 on board a pipelaying vessel 38 e.g. by welding, before it is passed across the lay ramp 40 of the pipelaying vessel and down into the sea 42, see FIG. 2. Once it is laid on the seabed 2, the deflection 1 may be disconnected from the laying cable 44 of the pipelaying vessel 38, and is then ready for connection to the connecting pipe 36 without requiring extensive supplementary work. Pig launching/receiving devices 34 are normally connected during the laying of the pipe, and may readily be retrieved to the surface and reinstalled with new pigs.

When compared with prior art, the invention helps to significantly simplify and reduced the costs of laying, connecting, starting up and maintaining subsea pipelines 3. The deflection 1 further exhibits several favourable characteristics in that the blind pipe 8 continues as a part of and preferably with the same dimension as the pipeline 3, the valves are not subjected to bending moments during laying or operation, the pipeline 3 and the blind pipe 8 rest on the seabed in a known manner without requiring an underlying additional shroud or other framework to support the deflection 1. The mechanical connections may be executed in the same manner as for known connecting tees.

The deflection 1 is suitable for use with standardised tools designed to carry out all forms of pigging operations.

The invention claimed is:

1. A device for connecting at least one of a pig launching/receiving device or connecting pipes to a submerged pipeline, the device comprising:
    a pipeline;
    a first bend operatively connected to the pipeline;
    a transition T-piece operatively connected to the first bend;
    a first remote branch connection operatively connected to the transition T-piece;
    a first valve operatively connected to the first remote branch connection; and
    a blind pipe projecting from the first bend, the blind pipe being substantially concentric with and extending in an opposite direction to the pipeline, wherein the blind pipe is not in fluid communication with the pipeline.

2. The device according to claim 1, further comprising:
    a pad eye operatively connected to an end of the blind pipe opposite the pipeline.

3. The device according to claim 1, further comprising:
    a second remote connection operatively connected to the pipeline.

4. The device according to claim 3, further comprising:
    a second valve operatively connecting the second remote connection to the pipeline.

5. The device according to claim 4, wherein at least one of the first remote connection and the second remote connection is at a level slightly higher than a center line of the pipeline at the first bend.

* * * * *